United States Patent
Luo

(10) Patent No.: US 12,253,779 B2
(45) Date of Patent: Mar. 18, 2025

(54) LIQUID CRYSTAL DISPLAY PANEL AND DRIVING METHOD THEREOF

(71) Applicant: Guangzhou China Star Optoelectronics Semiconductor Display Technology Co., LTD., Guangdong (CN)

(72) Inventor: Guoren Luo, Guangdong (CN)

(73) Assignee: Guangzhou China Star Optoelectronics Semiconductor Display Technology Co., LTD., Guangzhou (CN)

( * ) Notice: Subject to any disclaimer, the term of this patent is extended or adjusted under 35 U.S.C. 154(b) by 0 days.

(21) Appl. No.: 17/780,101

(22) PCT Filed: Apr. 20, 2022

(86) PCT No.: PCT/CN2022/087957
§ 371 (c)(1),
(2) Date: Oct. 5, 2023

(87) PCT Pub. No.: WO2023/184624
PCT Pub. Date: Oct. 5, 2023

(65) Prior Publication Data
US 2024/0231165 A1   Jul. 11, 2024

(30) Foreign Application Priority Data

Mar. 31, 2022 (CN) .......................... 202210342454.1

(51) Int. Cl.
*G02F 1/1362* (2006.01)
*G02F 1/1343* (2006.01)
(Continued)

(52) U.S. Cl.
CPC ...... *G02F 1/1368* (2013.01); *G02F 1/136209* (2013.01); *G09G 3/3648* (2013.01); *G02F 1/134309* (2013.01)

(58) Field of Classification Search
CPC ............. G02F 1/1335; G02F 1/133512; G02F 1/133514; G02F 1/1343; G02F 1/134309;
(Continued)

(56) References Cited

U.S. PATENT DOCUMENTS

2003/0016328 A1 * 1/2003 Chung .............. G02F 1/134336
349/149

FOREIGN PATENT DOCUMENTS

CN          101135818        3/2008
CN          102540586 A  *  7/2012 ........... G02F 1/1343
(Continued)

OTHER PUBLICATIONS

Patent Translate CN 102540586.*
(Continued)

*Primary Examiner* — Thoi V Duong

(57) ABSTRACT

A liquid crystal display panel and a driving method thereof are provided. In the liquid crystal display panel provided by embodiments of the present application, a first pixel electrode is configured for an image display in a main pixel region, and a second pixel electrode is configured for driving impurity ions in the liquid crystal layer to gather on a position of the first substrate and/or the second substrate corresponding to an auxiliary pixel region. The liquid crystal display panel is not affected by a bias electric field generated by an accumulation of the impurity ions which affects the image display, and has a display effect that is relatively better.

19 Claims, 4 Drawing Sheets

(51) Int. Cl.
  *G02F 1/1368* (2006.01)
  *G09G 3/36* (2006.01)
(58) Field of Classification Search
  CPC ............. G02F 1/1362; G02F 1/136209; G02F 1/1368; G09G 3/3648
  See application file for complete search history.

(56) References Cited

FOREIGN PATENT DOCUMENTS

| | | |
|---|---|---|
| CN | 102707528 | 10/2012 |
| CN | 104103250 | 10/2014 |
| CN | 113552750 | 10/2021 |
| JP | 2008-268253 | 11/2008 |
| JP | 2009-288436 | 12/2009 |

OTHER PUBLICATIONS

International Search Report and the Written Opinion Dated Dec. 19, 2022 From the International Searching Authority Re. Application No. PCT/CN2022/087957 and Its Translation Into English. (17 Pages).

* cited by examiner

LIQUID CRYSTAL DISPLAY PANEL AND DRIVING METHOD THEREOF

RELATED APPLICATIONS

This application is a National Phase of PCT Patent Application No. PCT/CN2022/087957 having International filing date of Apr. 20, 2022, which claims the benefit of priority of Chinese Patent Application No. 202210342454.1 filed on Mar. 31, 2022. The contents of the above applications are all incorporated by reference as if fully set forth herein in their entirety.

FIELD AND BACKGROUND OF THE INVENTION

The present disclosure relates to the field of display technologies, and more particularly, to a liquid crystal display panel and a driving method thereof.

BACKGROUND OF DISCLOSURE

A liquid crystal display (LCD) has advantages of a good display quality, a small size, a light weight, a low driving voltage, a low power consumption, no radiation, and a relatively low manufacturing cost, thereby dominating the field of display technologies. A liquid crystal display panel includes a color filter (CF) substrate, a thin-film transistor (TFT) substrate, and a liquid crystal layer disposed therebetween.

Since impurities or contamination of a liquid crystal material can be introduced during a manufacturing process of the liquid crystal display panel, impurity ions often exist in the liquid crystal layer of the liquid crystal display panel, and the impurity ions accumulate on the CF substrate and/or the TFT substrate. Since the impurity ions carry electric charges, a bias electric field is generated on the CF substrate and/or the TFT substrate. When the liquid crystal display panel displays images, the bias electric field on the CF substrate and/or the TFT substrate affects a normal image display, causing images on the liquid crystal display panel unable to be displayed normally or afterimages to appear on the liquid crystal display panel when switching the images, and a display effect is relatively poor.

SUMMARY OF THE INVENTION

A liquid crystal display panel and a driving method thereof are provided by the present application, and the liquid crystal display panel is not affected by a bias electric field generated by an accumulation of impurity ions which affects an image display, and has a display effect that is relatively better.

On one hand, the present application provides a liquid crystal display panel including: a first substrate; a second substrate disposed opposite to the first substrate; and a liquid crystal layer disposed between the first substrate and the second substrate; wherein the liquid crystal display panel includes a plurality of sub-pixel regions, each of the plurality of sub-pixel regions includes a main pixel region and an auxiliary pixel region, and the second substrate is provided with a first pixel electrode, a second pixel electrode, a first thin-film transistor (TFT), and a second TFT, wherein the first pixel electrode is disposed corresponding to the main pixel region, the second pixel electrode is disposed corresponding to the auxiliary pixel region, and the first TFT is electrically connected to the first pixel electrode, the second TFT is electrically connected to the second pixel electrode;

wherein the first pixel electrode is configured for displaying an image in the main pixel region, and the second pixel electrode is configured for driving a plurality of impurity ions in the liquid crystal layer to gather at a position on the first substrate and/or the second substrate corresponding to the auxiliary pixel region;

wherein the first substrate is provided with a first shielding layer, and the first shielding layer is disposed corresponding to the auxiliary pixel region.

In some embodiments, the liquid crystal display panel further includes a common electrode, and the common electrode is disposed in the first substrate or the second substrate;

wherein a voltage applied to the first pixel electrode is a first square wave, a voltage applied to the second pixel electrode is a second square wave, and a common voltage applied to the common electrode is a constant voltage.

In some embodiments, a maximum voltage of the first square wave is $a_1$, a minimum voltage of the first square wave is $a_2$; a maximum voltage of the second square wave is $b_1$, a minimum voltage of the second square wave is $b_2$; and a magnitude of the common voltage is c; wherein, a relationship among $a_1$, $a_2$, $b_1$, $b_2$, and c is: $|a_1-c|=|c-a_2|$ and $|b_1-c|\neq|c-b_2|$.

In some embodiments, $||b_1-c|-|c-b_2||\geq 0.5V$.

In some embodiments, an area of the main pixel region is greater than or equal to an area of the auxiliary pixel region.

In some embodiments, a material of the first shielding layer is metal.

In some embodiments, the metal includes one or more of molybdenum or titanium.

In some embodiments, the first substrate is further provided with a second shielding layer, and the second shielding layer is disposed in an interval region between adjacent sub-pixel regions.

On another hand, the present application provides a driving method of a liquid crystal display panel for driving the above-mentioned liquid crystal display panel, and the driving method includes:

driving the first pixel electrode through a first square wave, driving the second pixel electrode through a second square wave, and applying a constant common voltage on a common electrode of the liquid display panel;

wherein a maximum voltage of the first square wave is $a_1$, a minimum voltage of the first square wave is $a_2$; a maximum voltage of the second square wave is $b_1$, a minimum voltage of the second square wave is $b_2$; a magnitude of the common voltage is c; wherein, a relationship among $a_1$, $a_2$, $b_1$, $b_2$, and c is: $|a_1-c|=|c-a_2|$ and $|b_1-c|\neq|c-b_2|$.

In some embodiments, $||b_1-c|-|c-b_2||\geq 0.5V$.

In the liquid crystal display panel provided by the embodiment of the present application, since the sub-pixel regions each includes the main pixel region and the auxiliary pixel region, the first pixel electrode of the main pixel region and the second pixel electrode of the auxiliary pixel region are respectively driven by the first TFT and the second TFT, so that the first pixel electrode is configured for the image display in the main pixel region, and the second pixel electrode is configured for driving the impurity ions in the liquid crystal layer to gather at the position on the first substrate and/or the second substrate corresponding to the auxiliary pixel region. Through having the first shielding layer configured for shielding the auxiliary pixel region, the auxiliary pixel region can be prevented from light leakage which affects the image display. Therefore, the accumulation of the impurity ions causing generating of the bias electric field which affects the image display of the liquid crystal display panel 100 does not occur, and the display effect is better.

DESCRIPTION SPECIFIC EMBODIMENTS OF THE INVENTION

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application.

Figure 1:
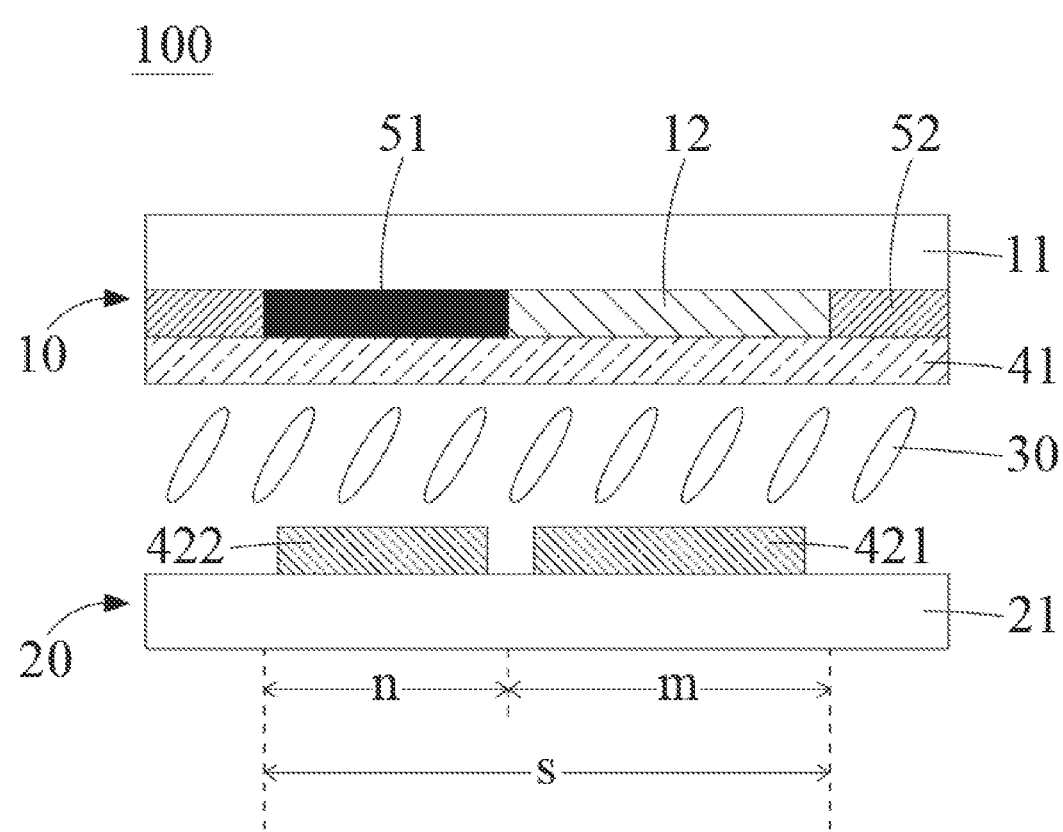
FIG. 1 is a schematic view of a first type of structure of a liquid crystal display panel provided by an embodiment of the present application.
Figure 2:
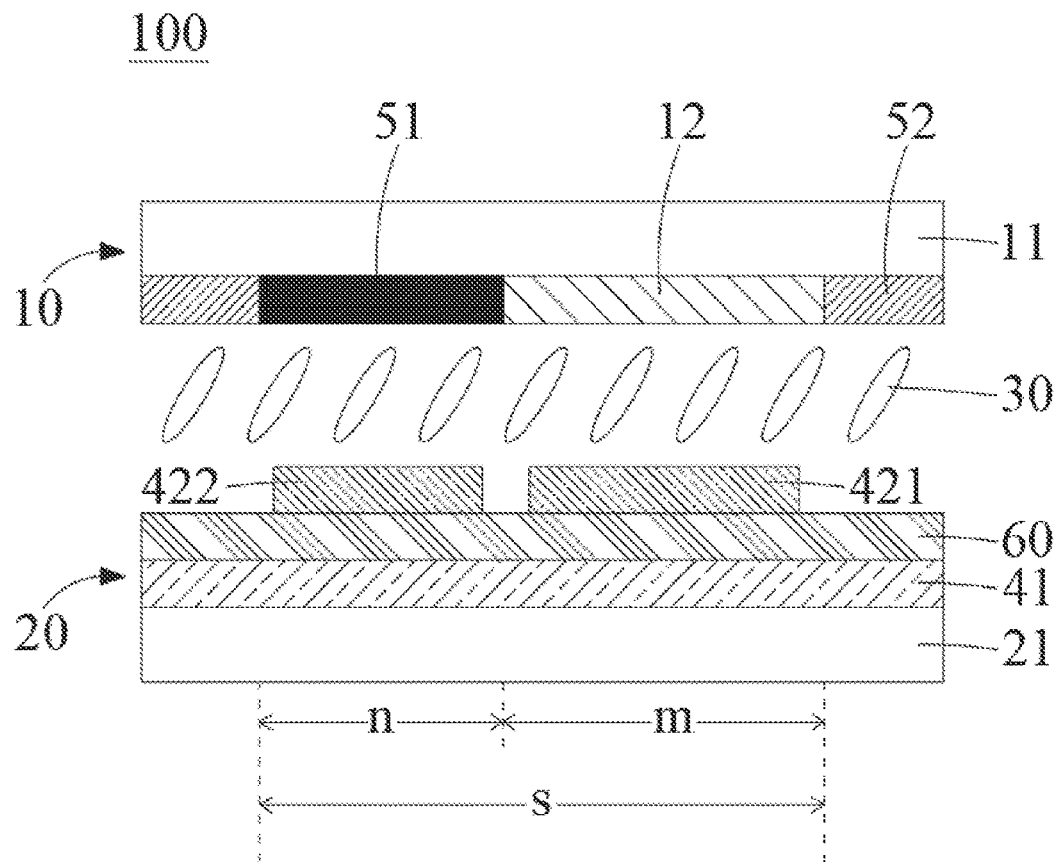
FIG. 2 is a schematic view of a second type of structure of the liquid crystal display panel provided by an embodiment of the present application.
Figure 3:
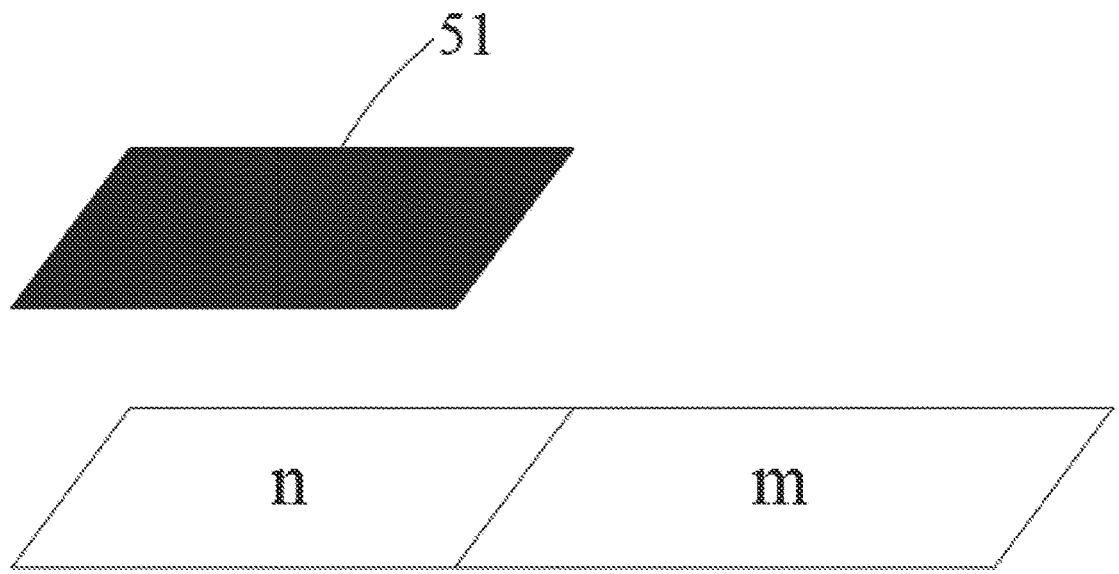
FIG. 3 is a schematic view of a correspondence of sub-pixel regions and a first shielding layer provided by an embodiment of the present application.

Referring to FIGS. 1-3, FIG. 1 is a schematic view of a first type of structure of a liquid crystal display panel provided by an embodiment of the present application, FIG. 2 is a schematic view of a second type of structure of the liquid crystal display panel provided by an embodiment of the present application, and FIG. 3 is a schematic view of a correspondence of sub-pixel regions and a first shielding layer provided by an embodiment of the present application. An embodiment of the present application provides a liquid crystal display panel 100, which includes a first substrate 10, a second substrate 20, and a liquid crystal layer 30. The first substrate 10 and the second substrate 20 are disposed opposite to each other, and the liquid crystal layer 30 is disposed between the first substrate 10 and the second substrate 20.

The liquid crystal display panel 100 includes a plurality of sub-pixel regions s, each of the sub-pixel regions s includes a main pixel region m and an auxiliary pixel region n. The second substrate is provided with a first pixel electrode 421, a second pixel electrode 422, a first thin-film transistor (TFT) (not shown) and a second TFT (not shown). The first pixel electrode 421 is disposed corresponding to the main pixel region m, the second pixel electrode 422 is disposed corresponding to the auxiliary pixel region n, the first TFT is electrically connected to the first pixel electrode 421, and the second TFT is electrically connected to the second pixel electrode 422.

The first pixel electrode 421 is configured for an image display in the main pixel region m, and the second pixel electrode 422 is configured for driving impurity ions in the liquid crystal layer 30 to gather at a position on the first substrate 10 and/or the second substrate 20 corresponding to the auxiliary pixel region n.

The first substrate 10 is provided with a first shielding layer 51, and the first shielding layer 51 is disposed corresponding to the auxiliary pixel region n.

It can be understood that a side of the first substrate 10 away from the liquid crystal layer 30 is a light-emitting side.

In the liquid crystal display panel 100 provided by the embodiment of the present application, since the sub-pixel regions s include the main pixel region m and the auxiliary pixel region n, the first pixel electrode 421 of the main pixel region m and the second pixel electrode 422 of the auxiliary pixel region n are respectively driven by the first TFT and the second TFT, so that the first pixel electrode 421 is configured for the image display in the main pixel region m through being driven by the first TFT, the second pixel electrode 422 is configured for attracting the impurity ions in the liquid crystal layer 30 through being driven by the second TFT, and the impurity ions in the liquid crystal layer 30 gather at the position on the first substrate 10 and/or the second substrate 20 corresponding to the auxiliary pixel region n. Through configuring the first shielding layer 51 for shielding the auxiliary pixel region n, the auxiliary pixel region n can be prevented from light leaking and affecting the image display. Therefore, an accumulation of the impurity ions causing generating of a bias electric field which affects the image display of the liquid crystal display panel 100 does not occur, and a display effect is better.

It can be understood that since the impurity ions gather at the position on the first substrate 10 and/or the second substrate 20 corresponding to the auxiliary pixel region n, a bias electric field is generated at these positions. If the auxiliary pixel region n is configured for the image display, a quality of the image display is definitely relatively poor, thereby affecting an overall display effect of the liquid crystal display panel 100. Therefore, in this embodiment of the present application, the first shielding layer 51 is configured for shielding the auxiliary pixel region n, i.e., only the main pixel region m is configured for the image display. Since the impurity ions do not gather at the position on the first substrate 10 and/or the second substrate 20 corresponding to the main pixel region m, a better display effect can be achieved, and an overall display quality of the liquid crystal display panel 100 can be enhanced.

Referring to FIG. 1 and FIG. 2, in some embodiments, the liquid crystal display panel 100 can further include a common electrode 41. The common electrode 41 is disposed in the first substrate 10 or the second substrate 20. A voltage applied to the first pixel electrode 421 is a first square wave, a voltage applied to the second pixel electrode 422 is a second square wave, and a common voltage applied to the common electrode 41 is a constant voltage.

Figure 4:
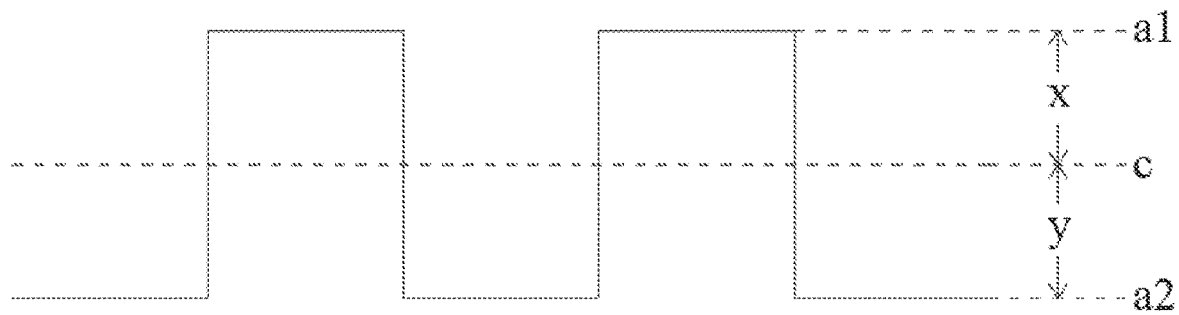
FIG. 4 is a schematic view of a structure of a first square wave provided by an embodiment of the present application.
Figure 5:
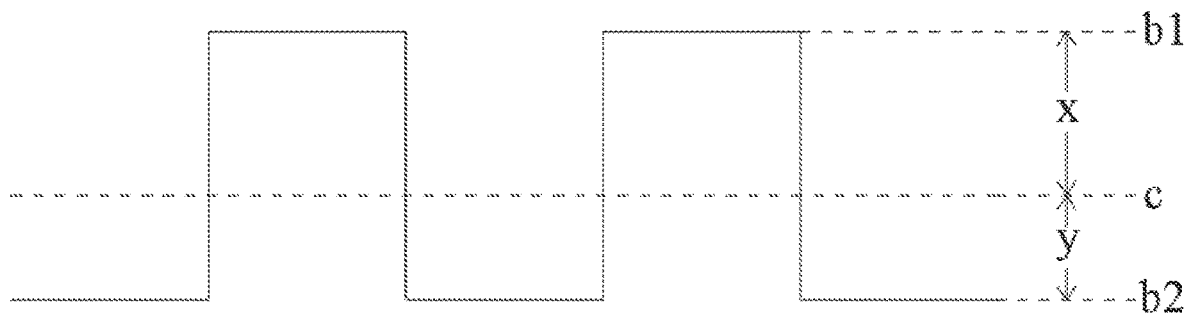
FIG. 5 is a schematic view of a structure of a first square wave provided by an embodiment of the present application.

Referring to FIG. 4 and FIG. 5, a maximum voltage of the first square wave is $a_1$, a minimum voltage of the first square wave is $a_2$, a maximum voltage of the second square wave is $b_1$, a minimum voltage of the second square wave is $b_2$, and a magnitude of the common voltage is c. A relationship among $a_1$, $a_2$, $b_1$, $b_2$, and c is: $|a_1-c|=|c-a_2|$ and $|b_1-c|\neq|c-b_2|$.

Exemplarily, $||b_1-c|-|c-b_2||\geq 0.5V$.

Exemplarily, an area of the main pixel region m is greater than or equal to an area of the auxiliary pixel region n. Exemplarily, the area of the auxiliary pixel region n can be 4/5, 3/5, 2/5, 2/3, 1/2, 1/3, 1/4, 1/5, 1/6, 1/7, 1/8, 1/9, 1/10, etc. of the area of the main pixel region m. Since the area of the auxiliary pixel region n is smaller, i.e., a proportion of the auxiliary pixel region n in a display area of the liquid crystal display panel 100 is smaller, thereby facilitating an enhancement of an opening ratio and a display brightness of the liquid crystal display panel 100.

In some embodiments, the sub-pixel regions s adopt an 8-domain design, and the main pixel region m and the auxiliary pixel region n both adopt a 4-domain design.

Exemplarily, a material of the first shielding layer 51 is a black resin material. Since the black resin material has a better light absorption performance, it can effectively absorb light, and prevent light leakage in an area on a light-emitting surface of the liquid crystal display panel 100 corresponding to the auxiliary pixel region n, which affects the display effect. Exemplarily, the black resin material can include a resin material and a black pigment, the resin material can be epoxy resin, polyacrylate, etc., and the black pigment can be carbon black, etc.

Exemplarily, the material of the first shielding layer 51 is metal. In some embodiments, the metal can include one or more of molybdenum (Mo) or titanium (Ti). Since metals such as molybdenum, titanium, etc. have good reflective properties, they can effectively block light and prevent the light leakage in the area on the light-emitting surface of the liquid crystal display panel 100 corresponding to the auxiliary pixel region n, which affects the display effect.

Referring to FIG. 1 and FIG. 2, the first substrate 10 is further provided with a second shielding layer 52, and the second shielding layer 52 is disposed in an interval region between adjacent sub-pixel regions s.

Exemplarily, a material of the second shielding layer 52 is a black resin material. Since the black resin material has a better light absorption performance, it can effectively absorb light, and prevent a light leakage in an area on a light-emitting surface of the liquid crystal display panel 100 corresponding to the interval region between the adjacent sub-pixel regions s, which affects the display effect.

Exemplarily, the material of the second shielding layer 52 is metal. In some embodiments, the metal can include one or more of molybdenum (Mo) or titanium (Ti). Since metals such as molybdenum, titanium, etc. have good reflective properties, they can effectively block light and prevent the light leakage in the area on the light-emitting surface of the liquid crystal display panel 100 corresponding to the interval region between the adjacent sub-pixel regions s, which affects the display effect.

Referring further to FIG. 1, the first substrate 10 is provided with the common electrode 41 and a color filter 12, and the second substrate 20 is provided with the first pixel electrode 421, the second pixel electrode 422, the first TFT (not shown), and the second TFT (not shown). At this time, the liquid crystal display panel 100 can be a vertical alignment (VA) type liquid crystal display panel.

Referring to FIG. 2, the first substrate 10 is provided with the color filter 12, and the second substrate 20 is provided with the common electrode 41, the first pixel electrode 421, the second pixel electrode 422, the first TFT (not shown), and the second TFT (not shown). The common electrode 41 is separated from the first pixel electrode 421 and the second pixel electrode 422 by an insulating layer 60. At this time, the liquid crystal display panel 100 can be a fringe-field switching (FFS) type liquid crystal display panel.

Referring to FIG. 1 and FIG. 2, the first substrate 10 can further include a first base 11, and film layers such as the common electrode 41 and the color filter 12 can be disposed on the first base 11. The first base 11 can be a rigid substrate or a flexible substrate, a material of the rigid substrate can be glass, and a material of the flexible substrate can be a polymer, such as polyimide.

The second substrate 20 can further include a second base 21, and film layers such as the first pixel electrode 421 and the second pixel electrode 422 may be disposed on the second base 21. The second base 21 can be a rigid substrate or a flexible substrate, a material of the rigid substrate can be glass, and a material of the flexible substrate can be a polymer, such as polyimide.

The present application further provides a method for driving a liquid crystal display panel, which can be configured for driving the liquid crystal display panel 100 in any of the above embodiments. The driving method: is further described in the following.

Referring to FIG. 4, the first pixel electrode 421 is driven by the first square wave. Referring to FIG. 5, the second pixel electrode 422 is driven by the second square wave. At the same time, the common voltage which is constant is applied on the common electrode 41 of the liquid crystal display panel 100;

The maximum voltage of the first square wave is $a_1$, the minimum voltage of the first square wave is $a_2$, the maximum voltage of the second square wave is $b_1$, the minimum voltage of the second square wave is $b_2$, and the magnitude of the common voltage is c. The relationship among $a_1$, $a_2$, $b_1$, $b_2$, and c is: $|a_1-c|=|c-a_2|$ and $|b_1-c|\neq|c-b_2|$.

Exemplarily, when the maximum voltage $a_1$ of the first square wave is 9V, the minimum voltage $a_2$ of the first square wave is 5V, and the common voltage c is 7V, $|a_1-c|=2V$, $|c-a_2|=2V$, and at this time, $|a_1-c|=|c-a_2|$.

In some embodiments, $||b_1-c|-|c-b_2||\geq 0.5V$. Exemplarily, a value of $||b_1-c|-|c-b_2||$ can be 0.5V, 1V, 1.5V, 2V, 2.5V, 3V, 3.5V, 4V, and so on.

Exemplarily, when the maximum voltage $b_1$ of the second square wave is 9V, the minimum voltage $b_2$ of the second square wave is 4V, the common voltage c is 7V, $|b_1-c|=2V$, $|c-b_2|=3V$, and at this time, $|b_1-c|\neq|c-b_2|$ and $||b_1-c|-|c-b_2||=1V$.

It should be noted that, for the main pixel region m, since $|a_1-c|=|c-a_2|$, i.e., since the maximum voltage $a_1$ and the minimum voltage $a_2$ of the first square wave are respectively adopted to drive the first pixel electrode 421, directions of voltages on two sides of the liquid crystal layer 30 are opposite to each other, and absolute values of the voltages are equal. Therefore, the impurity ions move for a same distance in opposite directions in the liquid crystal layer 30 as the maximum voltage $a_1$ and the minimum voltage $a_2$ of the first square wave alternate, so that an actual displacement of the impurity ions in a direction from the first substrate 10 to the second substrate 20 is zero, and the impurity ions are eventually suspended in the liquid crystal layer 30. Since the impurity ions are not adsorbed at the position on the first substrate 10 and/or the second substrate 20 corresponding to the auxiliary pixel region n, in the main pixel region m of the liquid crystal display panel 100, the accumulation of the impurity ions on the first substrate 10 and/or the second substrate 20 causing generating of the bias electric field which affects the image display of the liquid crystal display panel 100 does not occur.

For the auxiliary pixel region n, since $|b_1-c|\neq|c-b_2|$, i.e., since the maximum voltage $b_1$ and the minimum voltage $b_2$ of the second square wave are respectively adopted to drive the second pixel electrode 422, the directions of the voltages on two sides of the liquid crystal layer 30 are opposite to each other, but the absolute values of the voltages are not equal to each other. Therefore, as the maximum voltage $b_1$ and the minimum voltage $b_2$ of the first square wave alternate, the impurity ions in the liquid crystal layer 30 move in opposite directions, but since the absolute values of the voltages in the two directions are not equal to each other, the distances that the impurity ions move in the opposite directions in the liquid crystal layer 30 are different, which causes the actual displacement of the impurity ions in the direction from the first substrate 10 to the second substrate 20 not zero, and the impurity ions eventually gradually move towards the first substrate 10 and/or the second substrate 20 and are adsorbed on the position on the first substrate 10 and/or the second substrate 20 corresponding to the auxiliary pixel region n. Therefore, in the auxiliary pixel region n of the liquid crystal display panel 100, the impurity ions gather on the first substrate 10 and/or the second substrate 20 which causes a generation of the bias electric field. If the auxiliary pixel region n is also configured for the image display, then the image display of the liquid crystal display panel 100 is definitely affected. However, since the first shielding layer 51 is provided on the first substrate 10, and the first shielding layer 51 is configured for shielding the auxiliary pixel region n, in the embodiment of the present application, the auxiliary pixel region n is not configured for the image display, so the auxiliary pixel region n does not affect the image display of the liquid crystal display panel 100 in any way.

Figure 6:
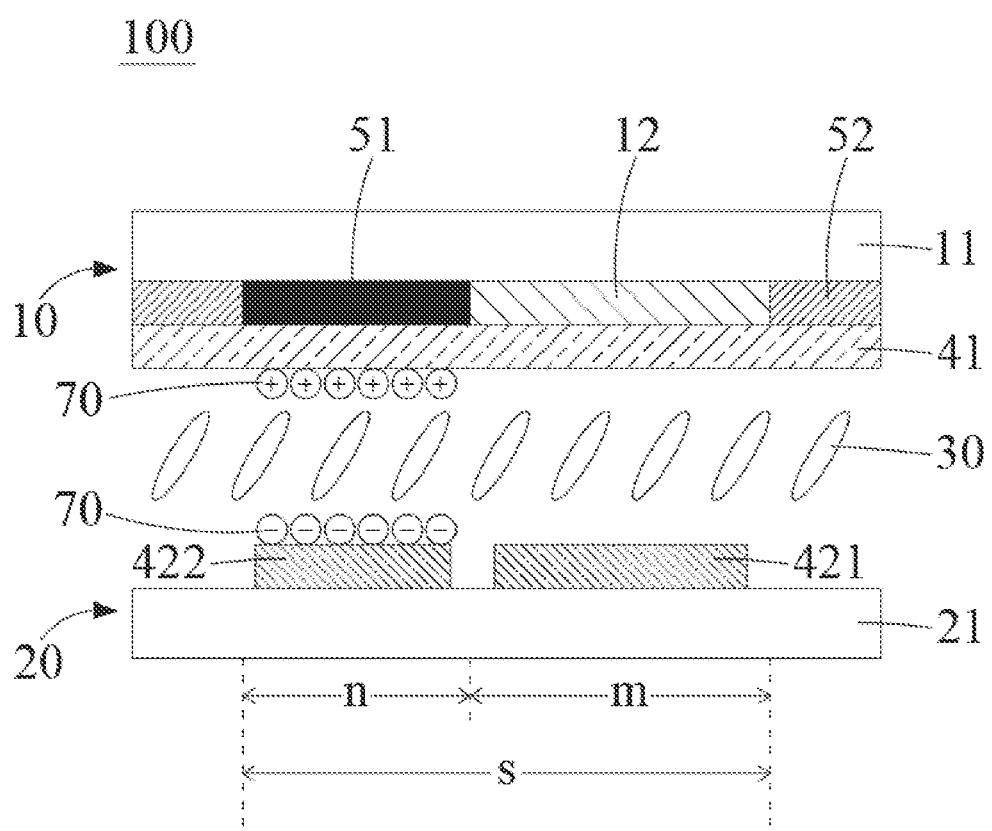
FIG. 6 is a schematic view of an aggregation of impurity ions in the liquid crystal display panel provided by an embodiment of the present application.

Furthermore, as shown in FIG. 6, since a bias voltage exist in the auxiliary pixel region n (i.e., $\|b_1-c|-|c-b_2\|$), the impurity ions 70 in the liquid crystal layer 30 corresponding to the auxiliary pixel region n are gradually adsorbed on the first substrate 10 and/or the second substrate 20, which causes a concentration of the impurity ions 70 in a region of liquid crystal layer 30 corresponding to the main pixel region m gradually reduces. Since the impurity ions 70 in the region of the liquid crystal layer 30 corresponding to the main pixel region m has a relatively high concentration, the impurity ions 70 in the region of the liquid crystal layer 30 corresponding to the main pixel region m gradually diffuse toward a region of the liquid crystal layer 30 corresponding to the auxiliary pixel region n. Eventually, the impurity ions 70 in the region of the liquid crystal layer 30 corresponding to the main pixel region m are all transferred to the region of the liquid crystal layer 30 corresponding to the auxiliary pixel region n, and are adsorbed on the position on the first substrate 10 and/or the second substrate 20 corresponding to the auxiliary pixel region n. At this time, since there are no impurity ions 70 in the region of the liquid crystal layer 30 corresponding to the main pixel region m, a best display effect can be achieved.

The present application further provide a display device, including the liquid crystal display panel 100 in any of the above embodiments.

Exemplarily, the display device can be a mobile terminal such as a TV, a mobile phone, a tablet computer, etc., and can also be a device with a display screen, such as a game device, an augmented reality (AR) device, a virtual reality (VR) device, a data storage device, an audio playback device, a video playback device, a wearable device, etc. The wearable device can be a smart bracelet, smart glasses, a smart watch, a smart decoration, etc.

The liquid crystal display panel and the driving method thereof provided by the present application are described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:

1. A liquid crystal display panel, comprising:
   a first substrate;
   a second substrate disposed opposite to the first substrate; and
   a liquid crystal layer disposed between the first substrate and the second substrate;
   wherein the liquid crystal display panel comprises a plurality of sub-pixel regions, each of the plurality of sub-pixel regions comprises a main pixel region and an auxiliary pixel region, and the second substrate is provided with a first pixel electrode, a second pixel electrode, a first thin-film transistor (TFT), and a second TFT, wherein the first pixel electrode is disposed corresponding to the main pixel region, the second pixel electrode is disposed corresponding to the auxiliary pixel region, and the first TFT is electrically connected to the first pixel electrode, the second TFT is electrically connected to the second pixel electrode;
   wherein the first pixel electrode is configured for displaying an image in the main pixel region, and the second pixel electrode is configured for driving a plurality of impurity ions in the liquid crystal layer to gather at a position on the first substrate or the second substrate corresponding to the auxiliary pixel region;
   wherein the first substrate is provided with a first shielding layer, and the first shielding layer is disposed corresponding to the auxiliary pixel region;
   wherein the liquid crystal display panel further comprises a common electrode, and the common electrode is disposed in the first substrate or the second substrate;
   wherein a voltage applied to the first pixel electrode is a first square wave, a voltage applied to the second pixel electrode is a second square wave, and a common voltage applied to the common electrode is a constant voltage;
   wherein a maximum voltage of the first square wave is $a_1$, a minimum voltage of the first square wave is $a_2$; a maximum voltage of the second square wave is $b_1$, a minimum voltage of the second square wave is $b_2$; and a magnitude of the common voltage is c; and
   wherein, a relationship among $a_1$, $a_2$, $b_1$, $b_2$, and c is: $|a_1-c|=|c-a_2|$ and $|b_1-c|\neq|c-b_2|$.

2. The liquid crystal display panel according to claim 1, wherein $\||b_1-c|-|c-b_2\|\geq 0.5V$.

3. The liquid crystal display panel according to claim 1, wherein an area of the main pixel region is greater than or equal to an area of the auxiliary pixel region.

4. The liquid crystal display panel according to claim 1, wherein a material of the first shielding layer is metal.

5. The liquid crystal display panel according to claim 4, wherein the metal comprises one or more of molybdenum or titanium.

6. The liquid crystal display panel according to claim 1, wherein a material of the first shielding layer is a black resin material.

7. The liquid crystal display panel according to claim 1, wherein the first substrate is further provided with a second shielding layer, and the second shielding layer is disposed in an interval region between adjacent sub-pixel regions.

8. The liquid crystal display panel according to claim 7, wherein a material of the second shielding layer is metal.

9. The liquid crystal display panel according to claim 8, wherein the metal comprises one or more of molybdenum or titanium.

10. A driving method of a liquid crystal display panel for driving a liquid crystal display panel, the liquid crystal display panel comprising:
  a first substrate;
  a second substrate disposed opposite to the first substrate; and
  a liquid crystal layer disposed between the first substrate and the second substrate;
  wherein the liquid crystal display panel comprises a plurality of sub-pixel regions, each of the plurality of sub-pixel regions comprises a main pixel region and an auxiliary pixel region, and the second substrate is provided with a first pixel electrode, a second pixel electrode, a first thin-film transistor (TFT), and a second TFT, wherein the first pixel electrode is disposed corresponding to the main pixel region, the second pixel electrode is disposed corresponding to the auxiliary pixel region, and the first TFT is electrically connected to the first pixel electrode, the second TFT is electrically connected to the second pixel electrode;
  wherein the first pixel electrode is configured for displaying an image in the main pixel region, and the second pixel electrode is configured for driving a plurality of impurity ions in the liquid crystal layer to gather at a position on the first substrate or the second substrate corresponding to the auxiliary pixel region;
  wherein the first substrate is provided with a first shielding layer, and the first shielding layer is disposed corresponding to the auxiliary pixel region;
  the driving method comprising:
  driving the first pixel electrode through a first square wave, driving the second pixel electrode through a second square wave, and applying a constant common voltage on a common electrode of the liquid crystal display panel;
  wherein a maximum voltage of the first square wave is $a_1$, a minimum voltage of the first square wave is $a_2$; a maximum voltage of the second square wave is $b_1$, a minimum voltage of the second square wave is $b_2$; and a magnitude of the common voltage is c; wherein, a relationship among $a_1$, $a_2$, $b_1$, $b_2$, and c is: $|a_1-c|=|c-a_2|$ and $|b_1-c|\neq|c-b_2|$.

11. The driving method of the liquid crystal display panel according to claim 10, wherein $\||b_1-c|-|c-b_2|\|\geq 0.5V$.

12. The driving method of the liquid crystal display panel according to claim 10, wherein the common electrode is disposed in the first substrate or the second substrate.

13. The driving method of the liquid crystal display panel according to claim 10, wherein an area of the main pixel region is greater than or equal to an area of the auxiliary pixel region.

14. The driving method of the liquid crystal display panel according to claim 10, wherein a material of the first shielding layer is metal.

15. The driving method of the liquid crystal display panel according to claim 14, wherein the metal comprises one or more of molybdenum or titanium.

16. The driving method of the liquid crystal display panel according to claim 10, wherein a material of the first shielding layer is a black resin material.

17. The driving method of the liquid crystal display panel according to claim 10, wherein the first substrate is further provided with a second shielding layer, and the second shielding layer is disposed in an interval region between adjacent sub-pixel regions.

18. The driving method of the liquid crystal display panel according to claim 17, wherein a material of the second shielding layer is metal.

19. The driving method of the liquid crystal display panel according to claim 18, wherein the metal comprises one or more of molybdenum or titanium.

* * * * *